United States Patent [19]
Frantz et al.

[11] Patent Number: 5,959,990
[45] Date of Patent: Sep. 28, 1999

[54] VLAN FRAME FORMAT

[75] Inventors: Paul James Frantz, Sunnyvale; Geoffrey O. Thompson, Palo Alto, both of Calif.

[73] Assignee: Bay Networks, Inc., Santa Clara, Calif.

[21] Appl. No.: 08/613,726

[22] Filed: Mar. 12, 1996

[51] Int. Cl.$^6$ ................................................. H04L 12/28
[52] U.S. Cl. ........................................... 370/392; 370/401
[58] Field of Search ..................................... 370/392, 393, 370/401, 466, 471, 474, 338, 397, 402; 395/200.01, 800

[56] References Cited

U.S. PATENT DOCUMENTS

| | | | |
|---|---|---|---|
| 5,220,564 | 6/1993 | Tuch et al. | 370/338 |
| 5,394,402 | 2/1995 | Ross | 370/94.1 |
| 5,560,038 | 9/1996 | Haddock | 395/800 |
| 5,583,862 | 12/1996 | Callon | 370/397 |
| 5,617,421 | 4/1997 | Chin et al. | 370/402 |

OTHER PUBLICATIONS

"Media Access Control (MAC) Bridging of Ethernet V2.0 In 802 Local Area Network", IEEE 1994, pp. 1–22, pp. i–iii.

*Primary Examiner*—Alpus H. Hsu
*Assistant Examiner*—William Luther
*Attorney, Agent, or Firm*—Blakely Sokoloff Taylor & Zafman, LLP

[57] ABSTRACT

In a network device such as a network switch having a port coupled to a communications medium dedicated to a single virtual local area network and another port coupled to a communications medium shared among multiple virtual local area networks for transmitting data frames between the dedicated communications medium and the shared communications medium, a method of identifying the virtual network associated with each data frame received by the network switch when transmitting the data frames over the shared communications medium. The method comprises receiving data frames from the dedicated communications medium coupled to one port, and, with respect to each data frame so received, inserting a type or length field and a virtual network identifier field either between or before the Ethernet type field (of an Ethernet data frame) or the length field (of an IEEE 802-based data frame) and the data field, placing the contents of the Ethernet type or length field in the inserted type or length field, changing the contents of the Ethernet type or length field to indicate the data frame comprises a new type field and a virtual network identifier field, placing a value in said virtual network identifier field identifying the virtual network associated with the data frame, and, transmitting the data frame over the shared communications medium. Upon receipt of the data frames from over the shared communications medium, another network device can discern from the virtual network identifier field in each data frame the virtual network from which the data frames were received and determine whether to forward the data frames accordingly.

33 Claims, 5 Drawing Sheets

VLAN FRAME FORMAT

COPYRIGHT NOTICE

Contained herein is material which is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The present invention relates to the field of data communications. More specifically, the present invention relates to a method and frame format for preserving in a data frame the virtual local area network (VLAN) associated with the data frame as determined by a network device from which the data frame was received when transmitting the data frame over a communications medium shared among multiple VLANs. The method and frame format are equally applicable when the network device uses criteria in addition to or instead of the ingress port to associate a VLAN with the data frame.

2. Description of the Related Art

A small baseband local area network (LAN) typically connects a number of nodes, e.g., a server and workstations, to a shared communications medium wherein all nodes compete for available bandwidth on the shared communications medium. In an Ethernet or Institute of Electrical and Electronics Engineers (IEEE) 802.3 standard local area network, when a node transmits a unicast data frame on the network, every node coupled to the shared medium receives and processes the data frame to determine if it is the node to which the data frame is destined. Moreover, when a station transmits a broadcast data frame on the network, all nodes see the data frame and must process it to determine whether they should respond to the broadcasting node. As the number of nodes coupled to the medium increase, data traffic can become congested, resulting in an undesirable level of collisions and network related delays in transmitting data frames, which in turn results in network and node performance degradation.

A common prior art method of reducing congestion is to separate a LAN into multiple LAN segments by way of a network device, such as a bridge or network switch, operating at the Media Access Control (MAC) sublayer of the Data Link layer (layer 2) of the International Standards Organization (ISO) Open Systems Interconnection (OSI) reference model. While all nodes in the data network may still belong to the same broadcast domain, that is, each node still transmits and receives broadcast data frames to/from all nodes on all LAN segments in the network, nodes sharing the same LAN segment see only unicast data frames generated by or destined to a node on the same LAN segment. Given that the bulk of data traffic on a LAN is unicast in nature, segmentation may somewhat reduce collisions and traffic related performance problems.

However, as the number of LAN segments and nodes per segment increases in the same broadcast domain, the nodes can become overburdened processing broadcast data frames. It may be desirable under such circumstances to separate the growing data network into multiple broadcast domains. One possible approach to creating multiple broadcast domains is to separate one or more LAN segments using a network device such as a router, operating at the Network layer (layer 3) of the OSI reference model. With reference to FIG. 1, a data network 10 is illustrated wherein a number of internetworking devices are installed to reduce traffic levels on each LAN segment. A router 100 separates LAN segments 103, 110 and 120 into one broadcast domain 11, and LAN segments 105, 130 and 140 into another broadcast domain 12.

For example, router 100 only forwards a unicast data frame from a node on LAN segments 103, 110 or 120 that is specifically addressed (at layer 3 of the OSI model) to a node on LAN segments 105, 130 or 140, and vise versa. Network devices 101 and 102 may be, for example, network switches. Network switch 101 separates LAN segments 103, 110 and 120 to reduce unicast traffic on each segment while the segments still remain in the same broadcast domain 11. Network switch 102 functions in a similar manner with respect to LAN segments 105, 130 and 140.

LAN segments 110, 120, 130 and 140 may have multiple nodes attached. For example, LAN segment 110 has nodes 111 and 112 coupled to it, and functions, therefore, as a shared communications medium, wherein the nodes share the available bandwidth (e.g., 10 million bits per second in a traditional Ethernet carrier sense, multiple access data bus with collision detection [CSMA/CD]). LAN segments 103 and 105, on the other hand, are dedicated LAN segments, therefore, nodes 104 and 106 have all available bandwidth to themselves. For example, nodes 104 and 106 may be servers requiring greater bandwidth. Dedicated LAN segments 103 and 105 may be any technology supporting delivery of Ethernet or IEEE 802 LLC data frames including CSMA/CD or Fiber Distributed Data Interface (FDDI) segments operating at 100 million bits per second, or Asynchronous Transfer Mode LAN emulation service running over segments operating at 155 million bits per second.

The router 100 has the further advantage of allowing for the implementation of policy restrictions among network administrator-defined groups in the network. For example, it may be desirable to prohibit nodes in broadcast domain 12 from communicating with nodes in broadcast domain 11 using any protocol except those specifically allowed by the network administrator.

However, as can be seen in FIG. 1, data network 10 involves significant hardware and software expenses associated with two network switches, a router, and the multiple communication lines required to achieve multiple broadcast domains. Moreover, a significant amount of administrative overhead is required to maintain the configuration and operation of the internetworking devices as required, for example, when a node is moved from one segment to another segment in the same or different broadcast domain. Thus, it is desirable to implement the data network 10 of FIG. 1 using a single network switch and virtual local area networks (VLANs).

FIG. 2A illustrates data network 10 using a single network switch 200 and virtual local area networks (VLANs) to create multiple broadcast domains 11 and 12. A VLAN is a logical local area network comprised of a plurality of physical local area networks as determined by some network administrator defined criteria, e.g., grouping local area networks based on geographical topology of the data network, or business units/functions of a company, such as finance or engineering departments. Such VLANs are generally configured based on the points where the physical LANs enter a switched network. For example, network switch 200 is configured such that ports 201 through 203 and 207 belong to VLAN 210, and ports 204–206 belong to VLAN 220.

LAN segments 103, 110 and 120 coupled to ports 201–203, respectively, belong to VLAN 210. LAN segments 130, 140 and 105 coupled to ports 204, 207, and 205, respectively, belong to VLAN 220. The configuration of data network 10 in FIG. 2A is relatively less expensive than the configuration of data network 10 in FIG. 1 in that only one switch is required. Moreover, since VLANs are configured at network switch 200, a network administrator can maintain configuration and operation of the network without concern for moving a node from one LAN segment to another LAN segment in the same VLAN.

When the system grows beyond the capacity of a single switch or when geographical constraints create a need for switching capacity at more than one site, additional switches are added to the network. FIG. 2B shows the addition of switch 300 to the network shown in FIG. 2A. LAN segment 190 is used to link switch 300 to switch 200. Switch 300 supports segments 150 and 160 in VLAN 210 and segments 170 and 180 in VLAN 220.

In the prior art, when switch 200 receives a broadcast packet from VLAN 210, station 104, it forwards the packet out all of its other VLAN 210 ports (202, 203 and 207) and also forwards it from port 208 to switch 300. Switch 300 examines the MAC source address (i.e., the ISO layer 2 source address) and based on a prior exchange of information with switch 200 is able to determine the proper VLAN to use for frames from that source address, in this case, VLAN 210. Based on this determination, switch 300 forwards the frame to all of its VLAN 210 ports (e.g., ports 302 and 303).

The success of this approach depends on prohibiting frames having the same MAC source address from appearing on multiple VLANs. However, the prohibition makes this approach unusable in some networks. To work around this problem, some prior art implementations use additional fields within the packet, such as the ISO layer 3 source address, to resolve ambiguities. However, even this approach does not work in all cases, as there are many types of frames which do not contain sufficient information to make a reliable VLAN determination. Examples of such frames include Internet Protocol (IP) BOOTP requests, IPX Get Nearest Server requests and frames from non-routable protocols.

All messages (in the form of a data frame) transferred between nodes of the same VLAN are transmitted at the MAC sublayer of the Data Link layer of the OSI reference model, based on each node's MAC layer address. However, there is no connectivity between nodes of different VLANs within network switch 200 or 300.

For example, with reference to FIG. 2A, even though all physical LAN segments 103, 105, 120, 130, and 140 are connected to ports on network switch 200, the VLAN configuration of switch 200 is such that nodes in one VLAN cannot communicate with nodes in the other VLAN via network switch 200. For example, node 104 can communicate with node 122 but cannot communicate with node 142 by way of switch 200. Rather, router 100 connects VLAN 210 to VLAN 220 via communications mediums 101 and 102 respectively, so that node 104 can communicate with node 142. Messages transferred between nodes of different VLANs are most often transmitted at the Network layer of the OSI reference model, based on the Network layer address of each node, e.g., an Internet Protocol (IP) address. Router 100 also allows a network administrator to configure appropriate policy restrictions and security rules to reduce unnecessary or unwanted traffic in data network 10.

Using a routing function to transfer data frames between VLAN 210 and VLAN 220 as illustrated in FIG. 2B is inappropriate, however, for data frames of protocol suites that do not support a network layer protocol, e.g., DEC LAT or NetBIOS. To deal with this problem, routers commonly provide a capability for bridging frames of non-routable protocols. For example, assume node 106 in VLAN 220 uses the DEC LAT protocol in an attempt to transmit a data frame to a node in VLAN 210. Switch 200 receives the data frame from node 106 over dedicated communications medium 105 and transfers it to router 100 via communications medium 102. Router 100, not being able to route DEC LAT traffic, may bridge the data frame back to switch 200 via communications medium 101. Switch 200 receives the data frame and, because the data frame is bridged instead of routed, the source MAC address is unchanged. Switch 200 has now received on both ports 205 (in VLAN 220) and 207 (in VLAN 210) a data frame having the MAC address for node 106, and cannot, therefore, unambiguously determine over which port node 106 is connected, or which VLAN should be associated with node 106. Therefore, switch 200 is unable to inform switch 300 of which VLAN should be associated with the MAC address of node 106.

Another circumstance which creates difficulties in establishing a MAC address to VLAN mapping is when a routing protocol, e.g., the DecNet routing protocol, transmits data frames using the same source MAC address on both communications mediums 101 and 102.

Yet another drawback of the configuration of data network 10 as illustrated in FIG. 2A is that a communications link is needed between network switch 200 and router 100 for each virtual local area network (VLAN). As the number of physical LAN segments and VLAN segments increase, and as the distance between LANs increase necessitating utilization of metropolitan and wide-area communications mediums/facilities, the monetary and administrative expense required to maintain data network 10 also increases. As illustrated in FIG. 3, one means of reducing this expense is to combine multiple communications links into a single shared communications medium 300 between switch 200 and router 100. The same problems which prevented switch 300 in FIG. 2B from reliably determining the proper VLAN for frames received over segment 190 also prevent switch 200 in FIG. 3 from reliably associating VLANs with data frames received over segment 300. Thus, a means is needed to identify the virtual local area network (VLAN) from which a frame originated when transferring the frame over a communications medium shared among multiple VLANs.

One such prior art method identifying the VLAN associated with a MAC address of a node involves creating and maintaining a lookup table on each network device in the data network. The lookup table contains entries associating the MAC address of a node with the port on the network device over which the node is reachable. The node may be coupled to a shared or dedicated communications medium which is further coupled to the port. Each entry also contains a VLAN identifier identifying the virtual local area network (VLAN) assigned to the port. If multiple network devices exist in the data network, as illustrated in FIG. 3, they may utilize a protocol to exchange lookup tables so that each device knows which VLAN is assigned to each port on each device and what nodes (identified by their respective MAC addresses) are reachable via each port as well as which nodes belong to the same VLAN and are allowed, therefore, to communicate with each other.

A prior art method of reliably identifying the VLAN from which a data frame originated utilizes a management defined field (MDF) of an IEEE standard 802.10 Secure Data Exchange (SDE) Protocol Data Unit (PDU). The MDF allows the transfer of proprietary information that may facilitate the processing of a data frame. The prior art method uses the MDF to store a VLAN identifier as the data frame is transferred from a network device over a communications medium shared among multiple VLANs so that when another network device receives a data frame from the shared communications medium, it can determine the VLAN associated with the data frame and determine whether to forward the frame accordingly, depending on the VLANs configured for each port on the network device.

FIG. 4 illustrates the frame format for an IEEE 802.3 MAC/802.10 SDE data frame utilizing the MDF to identify the VLAN associated with the data frame. Portion 401 of data frame 400 is the IEEE 802.3 media access control (MAC) header, comprising a 6 byte destination MAC address field, and 6 byte source MAC address field, and a 2 byte length field. Portion 402 indicates the IEEE 802.10 secure data exchange (SDE) clear header, comprising the SDE designator field 404 containing a special destination service access point (DSAP), source service access point (SSAP), and control field for SDE frames, a security association identifier (SAID) field 405, and the management defined field (MDF) 406. The remainder of the original data frame, comprising its IEEE 802.2 LLC header followed by the user data, is included in field 403.

A VLAN identifier representing the VLAN associated with the data frame received by the network device is placed in the MDF 406 by the MAC layer and other relevant hardware and software in the network device. When the frame is subsequently transmitted across a shared communications medium, such as when switch 300 of FIG. 2B forwards over shared communications medium 190 a data frame destined for a node coupled to a port associated with a different VLAN on switch 200, switch 200 is able to determine the VLAN from which the data frame was received by switch 300 and forward it accordingly to router 100 (if, indeed, inter-VLAN communication is required). Router 100 then routes the data frame back to switch 200, where switch 200 then determines whether to forward the frame to the appropriate port based on the VLAN identifier in the MDF and destination MAC address in the destination MAC address field.

However, the frame format illustrated in FIG. 4 supports only the IEEE 802.X media access control standards. An Ethernet-based data frame is considered nonstandard by the IEEE, and, therefore, cannot utilize the IEEE 802.10 header, or any other IEEE based header to preserve the VLAN, except through the use of an additional layer of encapsulation. IEEE Draft Recommendation Practice 802.1h is one way of performing this additional encapsulation. This extra layer of encapsulation reduces the efficiency of bandwidth utilization and adds complexity to the implementation. Thus, a method and frame format for identifying the VLAN associated with a data frame received at a network switch from either an Ethernet LAN or an IEEE 802 LAN is needed to support the existing infrastructure of Ethernet networks in a data network transmitting data frames from multiple VLANs across a shared communications medium. This will allow compatibility with Ethernet-based nodes on the same shared media with nodes supporting VLAN identification.

SUMMARY OF THE DISCLOSURE

The present invention relates to a method and frame format for preserving in a data frame as the data frame is transmitted across a communications medium shared among a plurality of virtual local area networks (VLANs), the VLAN which was associated with the data frame at the point where it entered the network. The method supports existing Ethernet based data network infrastructures.

The frame format extends the traditional Ethernet frame format to accommodate a VLAN header. In one embodiment, a unique Ethernet type field value is used to identify the data frame as having a VLAN header inserted between the Ethernet type field and the user data field. In another embodiment, the unique Ethernet type field value is used to identify the data frame as having a VLAN header inserted prior to the Ethernet type field.

The VLAN header comprises a field that contains the original value replaced in the Ethernet type field of an Ethernet data frame or the length field of an IEEE 802.3 data frame so that the original Ethernet type or IEEE 802.3 length is preserved when the data frame is transferred from a shared communications medium to a dedicated communications medium, as when happens when a network switch receives the data frame over shared communications medium coupling the network switch to another network switch, and transmits the data frame over a dedicated communications medium coupling the network switch to a node.

The VLAN header also comprises a VLAN identifier field that identifies the VLAN associated with the frame at the point at which the data frame was received by a network switch. The VLAN header is further comprised of a VLAN identifier type and VLAN identifier length field, both of which precede the VLAN identifier field and specify a format and length of the subsequent VLAN identifier field.

Thus it is an object of the present invention to provide a method and frame format for identifying the VLAN associated with a data frame received at a network switch from an Ethernet or IEEE 802.3 LAN. This is needed to support the existing infrastructure of Ethernet networks in a data network transmitting data frames from multiple VLANs across a shared communications medium. This will allow compatibility with both IEEE 802.3-based and traditional Ethernet-based nodes on the same shared media with nodes supporting VLAN identification as well.

It is another object of the present invention to provide a data frame format that allows for inclusion of a VLAN identifier field that does not extend the MAC frame so far as to require fragmentation to avoid ambiguity between Ethernet and IEEE 802.3 frame types.

BRIEF DESCRIPTION OF THE DRAWINGS

The present invention is illustrated by way of example and not limitation in the following figures. Like references indicate similar elements, in which:

FIG. 5(*b*) illustrates a modified Ethernet frame format as may be utilized by the present invention.

DETAILED DESCRIPTION OF THE EMBODIMENTS OF THE INVENTION

Described herein is a method and frame format for preserving in a data frame the virtual local area network (VLAN) associated with the data frame when transmitting the data frame over a communications medium shared among multiple VLANs. In the following description, numerous specific details are set forth in order to provide a thorough understanding of the present invention. It will be apparent, however, to one of ordinary skill in the art that present invention may be practiced without these specific details. In other instances, well-known standards, frame format details, and techniques have not been shown in order not to unnecessarily obscure the present invention.

As network switching becomes more prevalent in data networks, and in particular, local area networks, it is desirable to segment data traffic into groups of virtual local area networks (VLANs), as discussed above. Generally, the MAC address of each node, as determined by the contents of the source MAC address field of a data frame transmitted by the node, is mapped to, or associated with, a VLAN assigned to the port of a network device (e.g., a network switch) at which the data frame enters the switched network. The method by which the network device forwards the data frame varies depending on whether the target node (as determined by the MAC address in the destination MAC address field of the data frame) resides on the same or different VLAN as the source node. It may be desirable to use a standard shared communications medium such as IEEE standard 10BASE-F or 100BASE-T for a backbone transmission fabric between network devices in a switched network. However, unless separate cables are use for each VLAN, the VLAN association of each data frame cannot be determined when the data frame is transmitted over the shared communications medium. A means for identifying, or preserving, the VLAN associated with each data frame when transmitting the data frames over a shared communications medium is needed.

The method described herein provides for a shared communications medium for transferring data frames from multiple virtual local area networks (VLANS) while preserving the VLAN associated with each frame, regardless of whether the data network supports the interconnection of Ethernet or IEEE standard 802.3 nodes.

Figure 1:
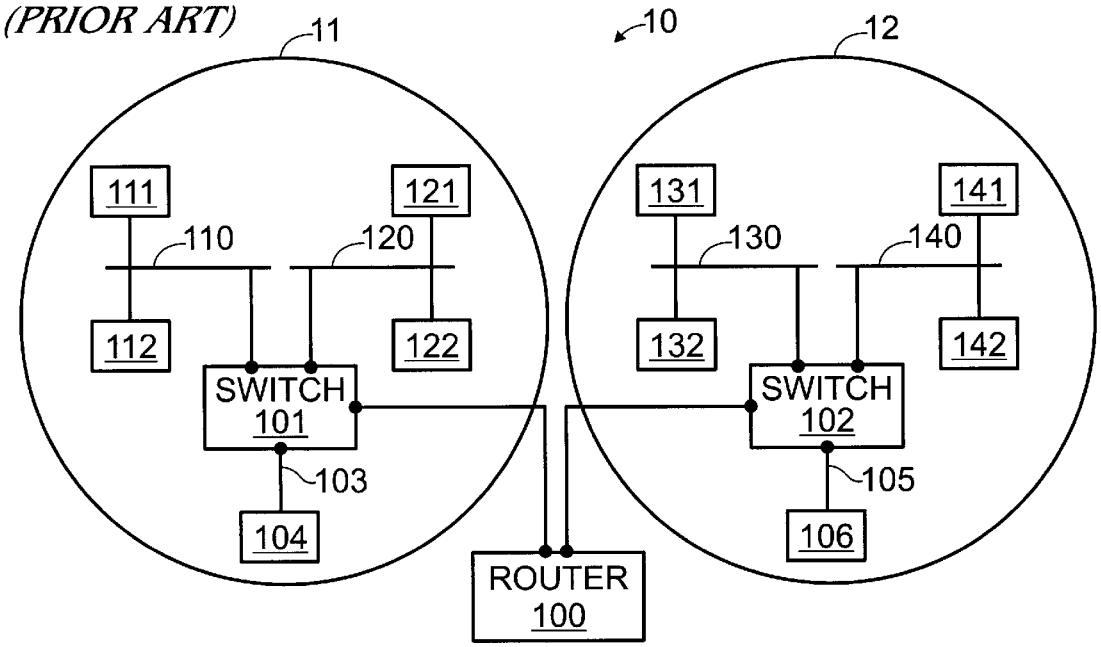
FIG. 1 illustrates a prior art data network topology.
Figure 2A:
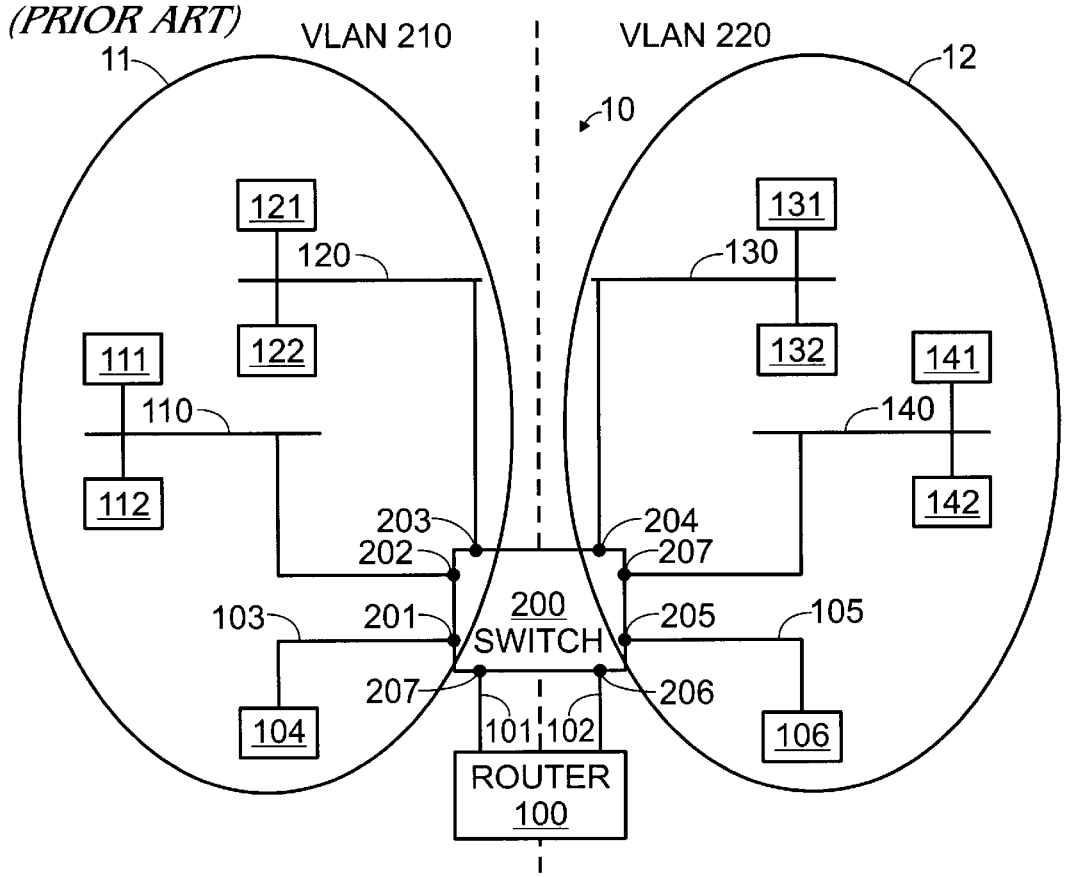
FIG. 2A illustrates a prior art data network topology utilizing virtual local area networks.
Figure 2B:
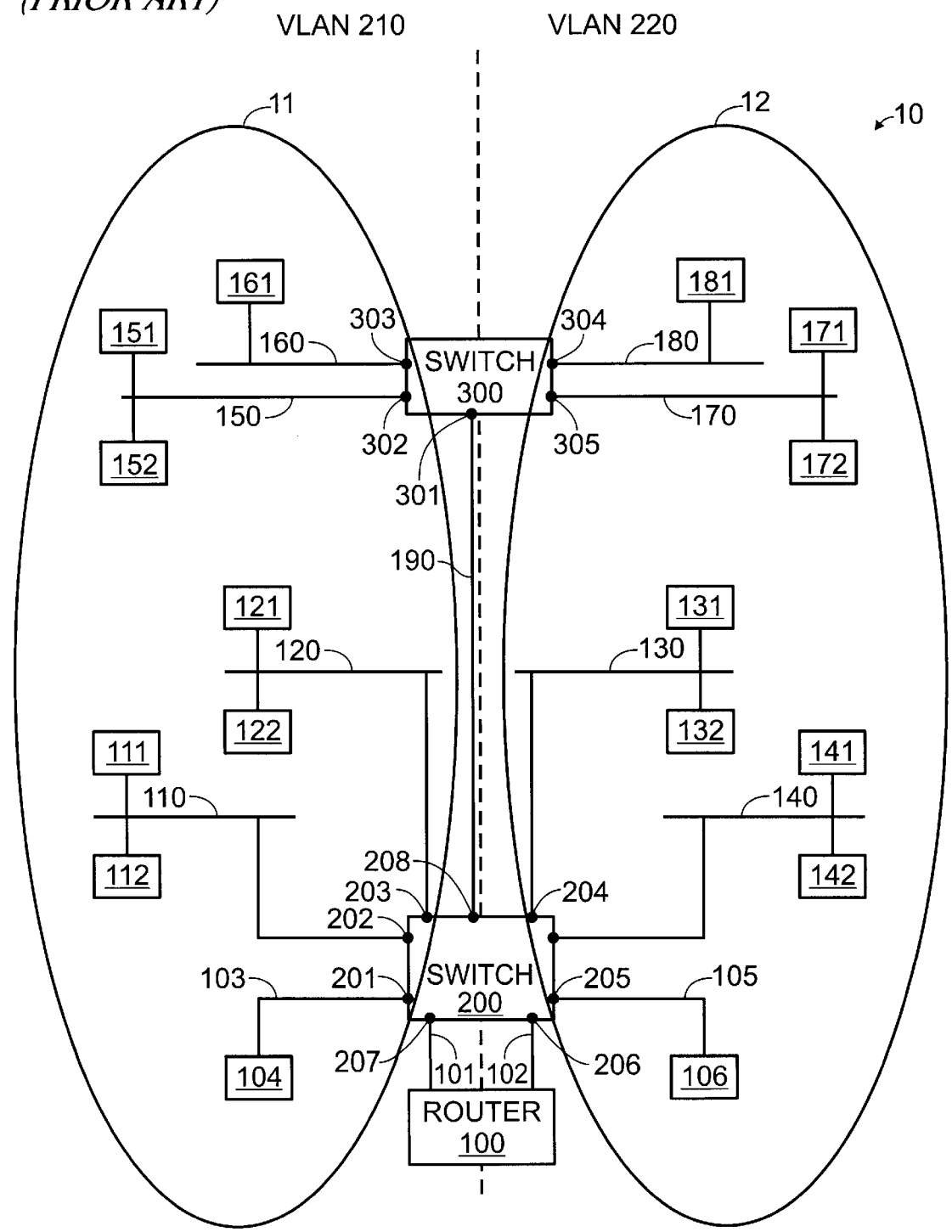
FIG. 2B illustrates a prior art data network topology utilizing virtual local area networks and shared communications media between network devices.
Figures 3, 4:
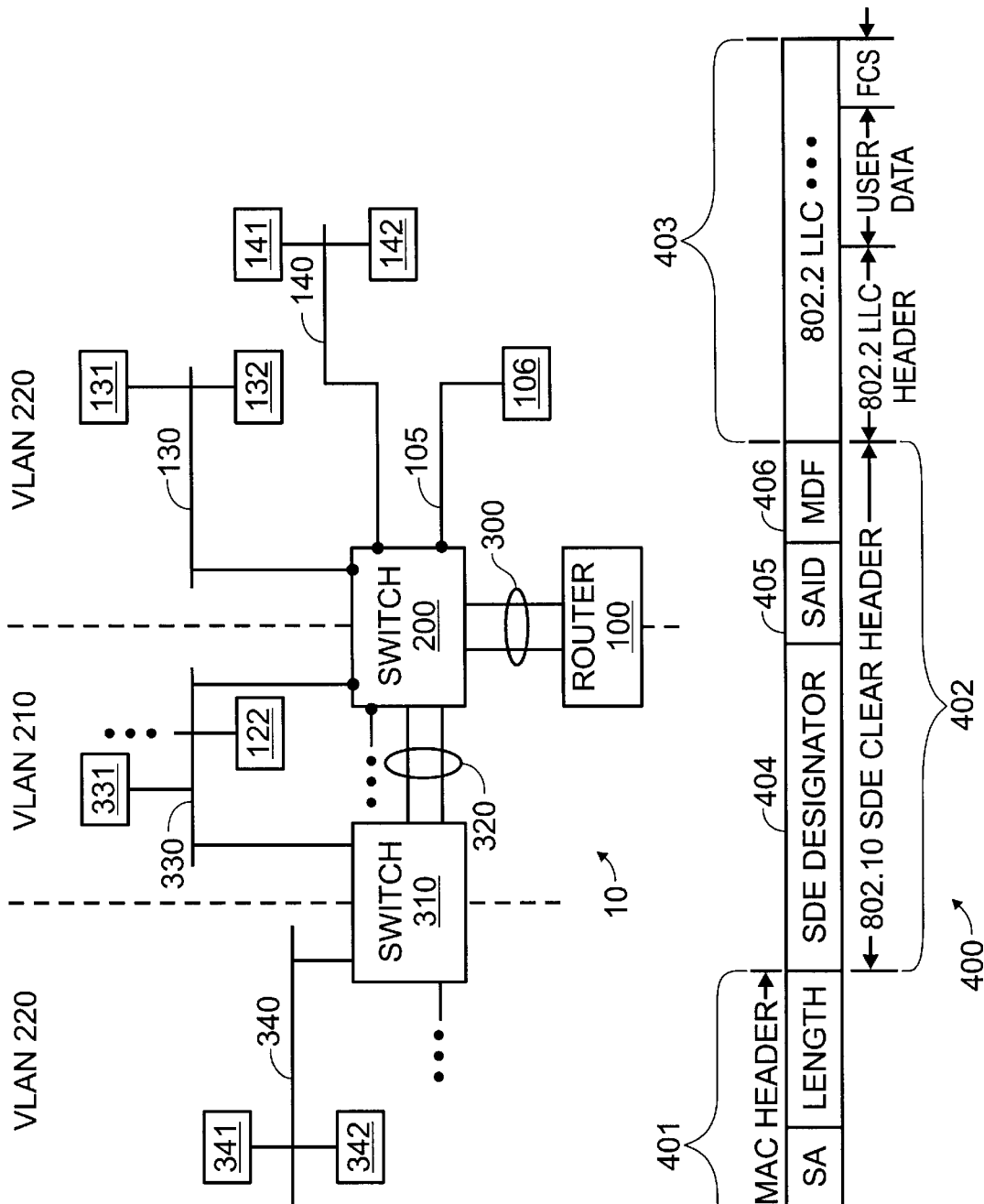
FIG. 3 further illustrates a prior art data network topology utilizing virtual local area networks and shared communications media between network devices.
FIG. 4 illustrates the IEEE 802.3 MAC/802.1 SDE frame format as may be utilized in the prior art.
Figure 5A:
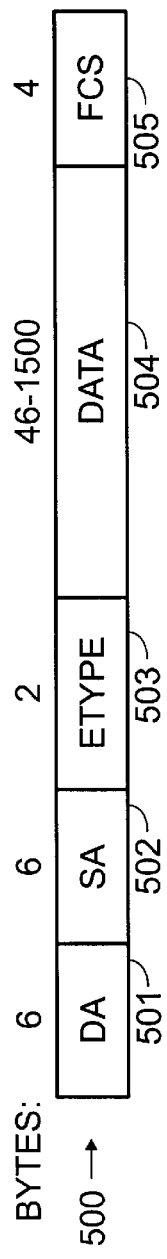
FIG. 5(*a*) illustrates an Ethernet frame format.
FIG. 5(c) illustrates a modified Ethernet frame format as may be utilized by the present invention.

FIG. 5(a) illustrates the data frame format for an Ethernet network. Like the IEEE standard 802.3 frame format, the Ethernet frame format begins with a 6 byte destination MAC address field followed by a 6 byte source MAC address field. However, unlike the IEEE standard 802.3 frame format, a 2 byte Ethernet type (ETYPE) field 503 follows the source MAC address field. The ETYPE field indicates the protocol type of the next upper layer protocol header which begins immediately following the ETYPE field (e.g., 0800(h) indicates the IP network layer protocol). The data field 504 comprises any upper layer protocol information and user data, all of which is considered data from the perspective of the MAC sublayer. Finally, a frame check sequence (FCS) field 505, comprising a 32-bit cyclical redundancy check (CRC) of the contents of fields 501, 502, 503 and 504, completes the data frame.

An IEEE 802.3 frame format also begins with a 6 byte destination MAC address field followed by a 6 byte source MAC address field. As is well known to those of skill in the art, a 2 byte LENGTH field follows the source MAC address field. It should be noted that the present invention, although based on a modification of the Ethernet frame format described above, applies equally well when the original frame is an IEEE 802-standard format (e.g., IEEE 802.3). In such a case, the field following the MAC source address contains not the protocol type of an upper layer protocol, but a value indicating the length of the data field, as discussed above. The present invention preserves the value in that field in a new extended Ethernet frame format, but makes no other use of it, and is, therefore, not sensitive to whether the field contains protocol type or length information.

Figure 5B:
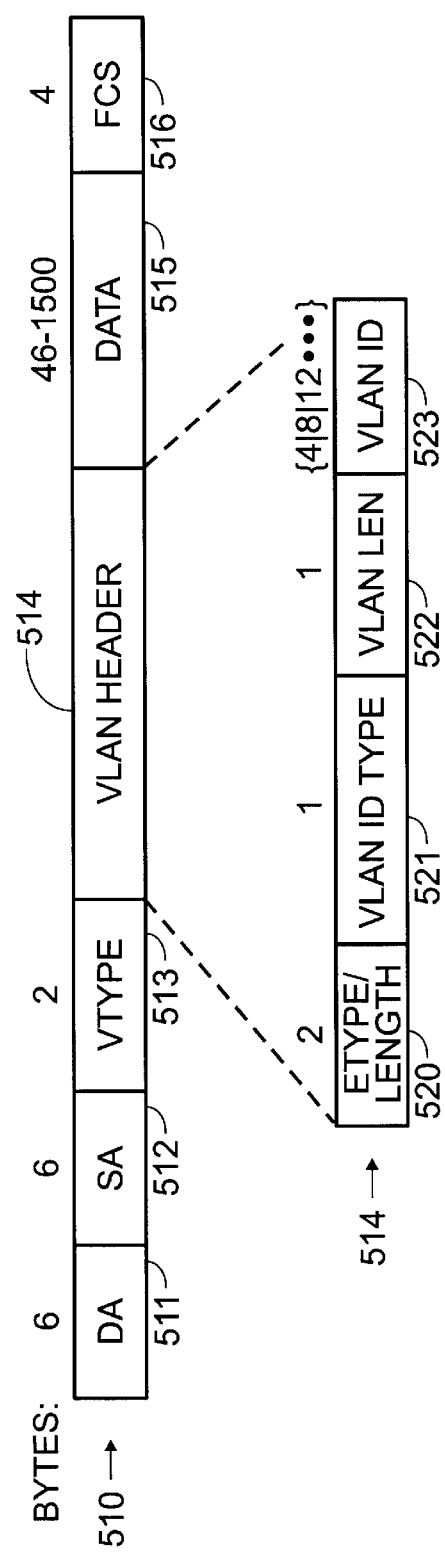

FIG. 5(b) illustrates the data frame format that may be utilized by one embodiment of the present invention. The frame format extends the Ethernet frame format illustrated in FIG. 5(a) to accommodate a virtual local area network (VLAN) header 514. In addition, a virtual type (VTYPE) field 513 replaces the ETYPE field 503 of an Ethernet data frame or the length field of an IEEE 802-based data frame to identify the frame as an extended Ethernet frame comprising a VLAN header 514 inserted, for example, before the data field 504 shown in FIG. 5(a).

The value in the ETYPE field 503 in FIG. 5(a), or the length field of an IEEE 802-based data frame, is not discarded. Rather, it is preserved at location 520 within the VLAN header 514 to be inserted back at location 503 when the data frame is transferred from a shared communications medium used to transmit data frames for multiple VLANs to a dedicated communications medium used to transmit data frames for a single VLAN.

A VLAN identifier type (VLAN ID TYPE) field and VLAN identifier length (VLAN LEN) field are present at locations 521 and 522, respectively. These two fields are used in combination to specify the format of the VLAN identifier (VLAN ID) field 523. Although this embodiment of the present invention utilizes only one type and length of VLAN ID field, is it foreseeable that multiple types of VLAN identifiers may be utilized, and that such identifiers may be of varying lengths, depending on the information conveyed by such identifiers, in which case, a network device receiving the data frame should check the VLAN ID TYPE and VLAN LEN fields and determine whether to accept or reject the data frame. In the event multiple VLAN ID TYPEs are utilized, it is envisioned that the VLAN ID TYPE values will be dispensed by an administrative authority.

The VLAN identifier length (VLAN LEN) field specifies the length of the VLAN identifier field in bytes. In this embodiment, the VLAN identifier field is 4 bytes in length. It is envisioned that the length of the VLAN identifier field will be a multiple of 4 bytes to maintain word alignment of fields in the data frame.

The VLAN identifier (VLAN ID) field 523 identifies the VLAN associated with the data frame. A network administrator or similar network wide authority is required to dispense values on a dynamic basis when configuring the virtual networks of the data network.

A new FCS 516 is calculated and replaces the prior FCS 505. FCS 516 performs a CRC on the destination and source MAC address fields, VTYPE field, VLAN header, and data field.

The extended Ethernet frame format illustrated in FIG. 5(b) may be utilized in the following manner. A network device (e.g., a network switch) has been configured so that a virtual local area network identifier representing a virtual local area network is assigned to each port on the network device. A data frame utilizing the Ethernet frame format (see FIG. 5(a)) or IEEE 802-based frame format may be transmitted by a node over a dedicated communications medium to the network switch. The network switch receives the data frame at a port coupled to the dedicated communications medium. At that time, or prior to transmitting the data frame over a shared communications medium to another network device, the network switch inserts a VLAN header between the ETYPE field or length field (depending on the frame format) and data field of the data frame. The value originally in the ETYPE field 503 (or length field in the case of an IEEE 802-based frame format) is moved to ETYPE/Length field 520 in the VLAN header. The ETYPE field 503 or length field is then modified to contain a value identifying the frame as containing VLAN identifier information (VTYPE 513). If utilized, a VLAN identifier type and VLAN identifier length field is inserted in VLAN header 514 at 521 and 522. Finally, the VLAN identifier associated with the data frame is placed in the VLAN identifier field 523. The data frame now having an extended Ethernet frame format is then transmitted over a shared communications medium.

Upon receiving the data frame, a network device processes the data frame. It determines the MAC address of a target node based on the contents of the destination MAC address field 511. The device then detects the presence of a VLAN header based on the contents of the VTYPE field, and determines the VLAN identifier associated with the data frame based on the contents of the VLAN identifier field. If a port on the network device which is eligible to receive the frame based on the destination MAC address is assigned the same VLAN identifier as the data frame, the network device then removes the VLAN header from the data frame, calculates a new FCS for the data frame, and transmits the data frame out the port over a dedicated communications medium to the target node.

Figure 5C:
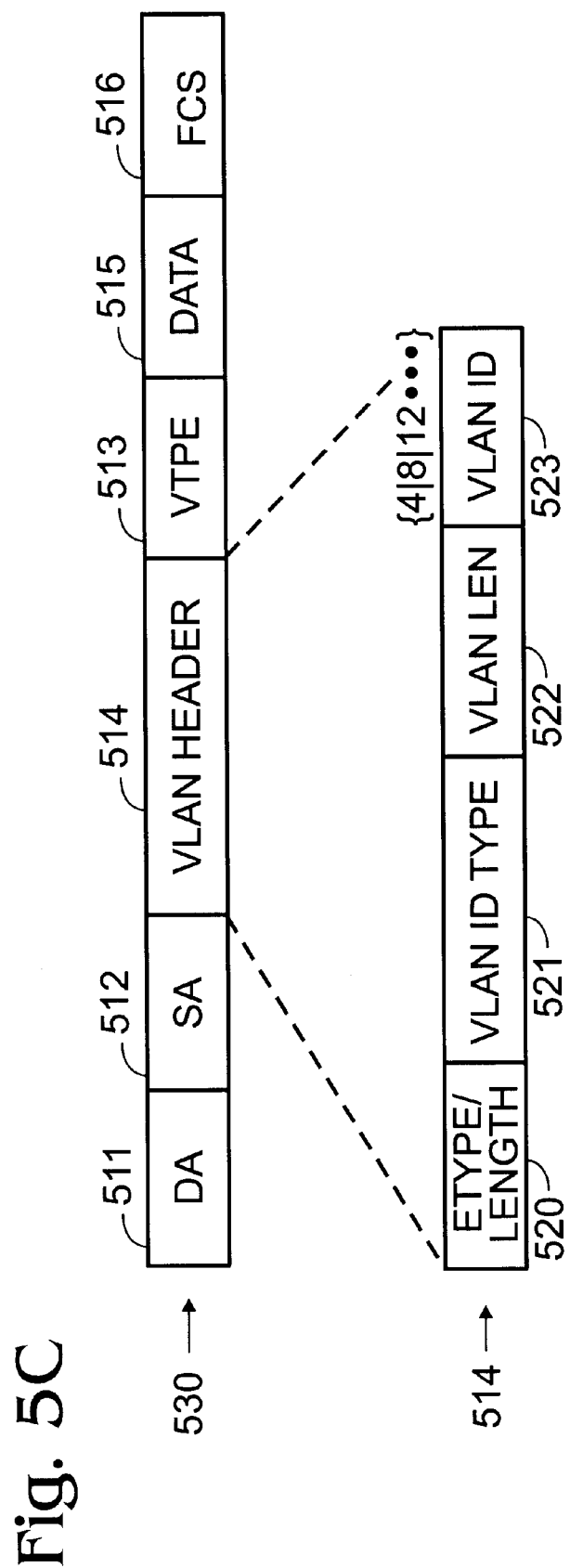

FIG. 5(c) illustrates the data frame format that may be utilized by an alternative embodiment of the present invention. The frame format also extends the Ethernet frame format illustrated in FIG. 5(a), as did the frame format in FIG. 5(b), to accommodate a virtual local area network (VLAN) header 514. As in the previous embodiment, a virtual type field 513 replaces the ETYPE field 503 of an Ethernet data frame or the length field of IEEE 802-based data frame to identify the frame as an extended Ethernet frame. However, unlike the previous embodiment, the VLAN header 514 is inserted before the VTYPE field 513 rather than after the VTYPE field.

As with the previous embodiment described above, the ETYPE field 503 in FIG. 5(a), or the length field of an IEEE 802-based data frame, is not discarded. It is also preserved at location 520 within the VLAN header 514. The VLAN header 514 is identical to the VLAN header 514 described above with respect to FIG. 5(b).

The extended Ethernet frame format illustrated in FIG. 5(c) is utilized in a similar manner as the extended Ethernet frame format illustrated in FIG. 5(b). For example, when a network switch receives the data frame at a port coupled to the dedicated communications medium, at that time, or prior to transmitting the data frame over a shared communications medium to another network device, the network switch inserts a VLAN header between the source address field 512 and the ETYPE or length field (depending on the frame format). The data frame now having a extended Ethernet frame format is then transmitted over a shared communications medium.

Upon receiving the data frame, a network device processes the data frame. It determines the MAC address of a target node based on the contents of the destination MAC address field 511, and the MAC address of a source node based on the contents of the source MAC address field 512. The device then detects the presence of the VLAN header 514, and determines the VLAN identifier associated with the data frame based on the contents of the VLAN identifier field 523. Subsequent to processing the VLAN header 514, the device then processes the VTYPE field 513.

There are, of course, alternatives to the described embodiments which are within the understanding of one of ordinary skill in the relevant art. For example, the type of network switch which has a single VLAN identifier associated with each port and assumes that a data frame received on a port is destined for the VLAN associated with that port is just one type of network switch. Network switches may present more sophisticated methods of handling VLANs. In the general case, when a data frame is received from an end station on a network switch port, the switch will apply a set of rules to determine the VLAN to which that data frame should be forwarded. The rules can include such things as the port number at which a data frame is received, the data frame's ISO layer three protocol type, the data frame's MAC or network layer source address, time of day, etc. More importantly, the first network switch to receive the data frame should apply its rules and assign the data frame to a VLAN. Thus, the present invention is intended to be limited only by the claims presented below.

Thus, what has been described is a method and frame format for preserving in a data frame the virtual local area network (VLAN) associated with a port on a network device from which the data frame was received when transmitting the data frame over a shared communications medium.

We claim:

1. In a network device, a method of transmitting, on a shared communications medium coupled to said network device, a data frame associated with a virtual network, comprising the steps of:

a) transmitting a data frame having a type field whose contents indicate said data frame comprises a virtual network identifier field; and, b) transmitting said virtual network identifier field whose contents indicate said virtual network associated with said data frame.

2. In a network device, a method of transmitting a virtual network identifier in a data frame transmitted on a shared communications medium, coupled to said network device, comprising the steps of:

a) transmitting a preamble field;

b) transmitting a destination and source media access control address field;

c) transmitting a type field whose contents indicate said virtual network identifier follows;

d) transmitting a virtual network identifier field containing said virtual network identifier;

e) transmitting a data field; and, f) transmitting a frame check sequence.

3. The method of claim 2 wherein said virtual network identifier field is 4 bytes.

4. In a network device having a first port coupled to a local area network (hereafter LAN) segment and a second port coupled to a shared communications medium, a method of associating a virtual network with a data frame received from said LAN segment and transmitted to said shared communications medium, comprising the steps of:

a) receiving said data frame at said first port, said data frame comprising a type field and a data field;

b) replacing a first value in said type field representing a protocol type with a second value indicating said data frame comprises a virtual network identifier field;

c) inserting said virtual network identifier field in said data frame between said type field and said data field;

d) assigning a value representing said virtual network to said virtual network identifier field; and, e) transmitting said data frame from said second port.

5. The method of claim 4 further comprising, following step d), the steps of:

a) inserting a new type field between said type field and said virtual network identifier field; and, b) assigning said first value representing said protocol type to said new type field to preserve said protocol type.

6. The method of claim 5 wherein said virtual network identifier field is 4 bytes.

7. The method of claim 5 wherein said virtual network identifier field is a multiple of 4 bytes.

8. In a network device having a first port coupled to a local area network (hereafter LAN) segment and a second port coupled to a shared communications medium, a method of associating a virtual network with a data frame received from said LAN segment and transmitted to said shared communications medium, comprising the steps of:

a) receiving said data frame at said first port, said data frame comprising a length field and a data field;

b) replacing a first value in said length field with a second value indicating said data frame comprises a virtual network identifier field;

c) inserting said virtual network identifier field in said data frame between said length field and said data field;

d) assigning a value representing said virtual network to said virtual network identifier field; and, e) transmitting said data frame from said second port.

9. The method of claim 8 further comprising, following step d), the steps of:

a) inserting a new length field between said length field and said virtual network identifier field; and, b) assigning said first value to said new length field.

10. The method of claim 9 wherein said virtual network identifier field is 4 bytes.

11. The method of claim 9 wherein said virtual network identifier field is a multiple of 4 bytes.

12. In a network device having a first port coupled to a communications medium and a second port coupled to a shared communications medium for transmitting data frames between said communications medium and said shared communications medium, a method of identifying a virtual network associated with said data frame when transmitting said data frame between said communications medium and said shared communications medium, comprising the steps of:

a) receiving said data frame from said communications medium at said first port, said data frame comprising, in order, a first type field and a data field;

b) inserting a second type field and a virtual network identifier field, hereafter referred to as VNIF, between said first type field and said data field;

c) placing the contents of said first type field in said second type field;

d) changing the contents of said first type field to indicate said data frame comprises said second type field and said VNIF;

e) placing a value in said VNIF indicating said virtual network associated with said data frame; and, f) transmitting said data frame over said shared communications medium.

13. The method of claim 12 wherein said VNIF is 4 bytes.

14. The method of claim 12, wherein step b) is further comprised of the steps of:

1) inserting between said second type field and said VNIF a virtual network identifier type field and a virtual network identifier length field, and, step e) is followed by the steps of:

2) placing a value in said virtual network identifier type field indicating a type of said VNIF; and, 3) placing a value in said virtual network identifier length field indicating a length of said VNIF.

15. The method of claim 14 wherein said VNIF is a multiple of 4 bytes.

16. In a network device having a first port coupled to a communications medium and a second port coupled to a shared communications medium for transmitting data frames between said communications medium and said shared communications medium, a method of identifying a virtual network associated with said data frame when transmitting said data frame between said communications medium and said shared communications medium, comprising the steps of:

a) receiving said data frame from said communications medium at said first port, said data frame comprising, in order, a first length field and a data field;

b) inserting a second length field and a virtual network identifier field, hereafter referred to as VNIF, between said first length field and said data field;

c) placing the contents of said first length field in said second length field;

d) changing the contents of said first length field to indicate said data frame comprises said second length field and said VNIF;

e) placing a value in said VNIF indicating said virtual network associated with said data frame; and, f) transmitting said data frame over said shared communications medium.

17. The method of claim 16 wherein said VNIF is 4 bytes.

18. The method of claim 16, wherein:

step b) is further comprised of the step of:

1) inserting between said second length field and said VNIF a virtual network identifier type field and a virtual network identifier length field, and, step e) is followed by the steps of:

2) placing a value in said virtual network identifier type field indicating a type of said VNIF; and, 3) placing a value in said virtual network identifier length field indicating a length of said VNIF.

19. The method of claim 18 wherein said VNIF is a multiple of 4 bytes.

20. In a network device, a method of transmitting a virtual network identifier in a data frame transmitted on a shared communications medium, coupled to said network device, comprising the steps of:

a) transmitting a preamble field;

b) transmitting a destination and source media access control address field;

c) transmitting a virtual network identifier field containing said virtual network identifier;

d) transmitting a type field whose contents indicate said virtual network identifier is present in the preceding said virtual network identifier field;

e) transmitting a data field; and, f) transmitting a frame check sequence.

21. The method of claim 20 wherein said virtual network identifier field is 4 bytes.

22. In a network device having a first port coupled to a local area network (hereafter LAN) segment and a second port coupled to a shared communications medium, a method of associating a virtual network with a data frame received from said LAN segment and transmitted to said shared communications medium, comprising the steps of:

a) receiving said data frame at said first port, said data frame comprising a type field and a data field;

b) replacing a first value in said type field representing a protocol type with a second value indicating said data frame comprises a virtual network identifier field;

c) inserting said virtual network identifier field in said data frame before said type field and said data field;

d) assigning a value representing said virtual network to said virtual network identifier field; and, e) transmitting said data frame from said second port.

23. The method of claim 22 further comprising, following step d), the steps of:

a) inserting a new type field between said virtual network identifier field and said data field; and, b) assigning said first value representing said protocol type to said new type field to preserve said protocol type.

24. The method of claim 23 wherein said virtual network identifier field is 4 bytes.

25. The method of claim 23 wherein said virtual network identifier field is a multiple of 4 bytes.

26. In a network device having a first port coupled to a communications medium and a second port coupled to a shared communications medium for transmitting data frames between said communications medium and said shared communications medium, a method of identifying a virtual network associated with said data frame when transmitting said data frame between said communications medium and said shared communications medium, comprising the steps of:

a) receiving said data frame from said communications medium at said first port, said data frame comprising, in order, a first type field and a data field;

b) inserting a second type field and a virtual network identifier field, hereafter referred to as VNIF, before said first type field and said data field;

c) placing the contents of said first type field in said second type field;

d) changing the contents of said first type field to indicate said data frame comprises said second type field and said VNIF;

e) placing a value in said VNIF indicating said virtual network associated with said data frame; and, f) transmitting said data frame over said shared communications medium.

27. The method of claim 26 wherein said VNIF is 4 bytes.

28. The method of claim 26 wherein step b) is further comprised of the steps of:

1) inserting between said second type field and said VNIF a virtual network identifier type field and a virtual network identifier length field, and, step e) is followed by the steps of:

2) placing a value in said virtual network identifier type field indicating a type of said VNIF; and, 3) placing a value in said virtual network identifier length field indicating a length of said VNIF.

29. The method of claim 28 wherein said VNIF is a multiple of 4 bytes.

30. In a network device having a first port coupled to a communications medium and a second port coupled to a shared communications medium for transmitting data frames between said communications medium and said shared communications medium, a method of identifying a virtual network associated with said data frame when transmitting said data frame between said communications medium and said shared communications medium, comprising the steps of:

a) receiving said data frame from said communications medium at said first port, said data frame comprising, in order, a first length field and a data field;

b) inserting a second length field and a virtual network identifier field, hereafter referred to as VNIF, before said first length field and said data field;

c) placing the contents of said first length field in said second length field;

d) changing the contents of said first length field to indicate said data frame comprises said second length field and said VNIF;

e) placing a value in said VNIF indicating said virtual network associated with said data frame; and, f) transmitting said data frame over said shared communications medium.

31. The method of claim 30 wherein said VNIF is 4 bytes.

32. The method of claim 30, wherein:

step b) is further comprised of the step of:

1) inserting between said second length field and said VNIF a virtual network identifier type field and a virtual network identifier length field, and, step e) is followed by the steps of:

2) placing a value in said virtual network identifier type field indicating a type of said VNIF; and, 3) placing a value in said virtual network identifier length field indicating a length of said VNIF.

33. The method of claim 32 wherein said VNIF is a multiple of 4 bytes.

* * * * *